(12) United States Patent
Campbell

(10) Patent No.: US 8,138,635 B2
(45) Date of Patent: Mar. 20, 2012

(54) DC INJECTION OF ENERGY FROM RENEWABLE POWER SOURCES

(76) Inventor: Jason D. Campbell, Pittsburgh, PA (US)

( * ) Notice: Subject to any disclaimer, the term of this patent is extended or adjusted under 35 U.S.C. 154(b) by 176 days.

(21) Appl. No.: 12/416,063

(22) Filed: Mar. 31, 2009

(65) Prior Publication Data

US 2010/0246233 A1    Sep. 30, 2010

(51) Int. Cl.
*H01H 9/54* (2006.01)
(52) U.S. Cl. ....................................................... 307/140
(58) Field of Classification Search .................... 307/140
See application file for complete search history.

(56) References Cited

U.S. PATENT DOCUMENTS

| 7,629,708 B1 * | 12/2009 | Meyers et al. ................... 307/66 |
| 2006/0087800 A1 * | 4/2006 | Savage ........................... 361/601 |
| 2010/0073969 A1 * | 3/2010 | Rajagopalan et al. .......... 363/37 |

* cited by examiner

*Primary Examiner* — Robert L. Deberadinis
(74) *Attorney, Agent, or Firm* — Ryder, Lu, Mazzeo and Konieczny, LLC; Douglas J. Ryder

(57) ABSTRACT

In general, in one aspect, the disclosure describes an apparatus to enable direct injection of DC power from a renewable power source (e.g., solar) into an electronic device (e.g., computer). The DC power from the renewable source is injected into the electronic device on the DC side of a power supply used to provide power thereto. The DC power is injected into a tap that is installed between the power supply and a system board using the DC power. The apparatus may include a voltage regulator that converts the DC power to a DC voltage associated with the electronic device. The set point of the voltage regulator may be on the high side of the voltage range of the electronic device so that power is preferentially provided by the renewable source with additional power being provided by the power supply. Other embodiments are described and claimed.

20 Claims, 3 Drawing Sheets

DC INJECTION OF ENERGY FROM RENEWABLE POWER SOURCES

BACKGROUND

Renewable energy sources such as solar and wind power are well suited to distributed generation. However, renewable energy sources are too variable to use as a primary power supply without large and expensive battery banks to store and distribute power as required/needed. Accordingly, smaller renewable energy source installations are often utilized in urban/suburban environments to interconnect with the power grid to ensure 24×7 availability of power. Unfortunately, the practical arrangements required for such interconnects substantially reduces the efficiency of the total system.

For example, renewable energy sources (e.g., solar) may typically generate direct current (DC) energy. The energy required by the power grid is alternating current (AC) so that the DC power of the solar panel needs to be converted to AC. Small and medium-scale DC-AC inverters may average approximately 90% efficiency (older units may have efficiencies as low as 60%) so that approximately 10% of the generated energy is lost providing it to the power grid.

Electronics (e.g., computing systems) generally require DC power rather than typical power grid AC. Power supply units (PSUs) for electronic devices may employ a variety of conversion techniques to effect the conversion from AC-DC. The AC-DC conversion techniques may also impose losses. For example, PSUs for computers may have an efficiency range from approximately 70-85%.

For both AC-DC inversion and DC-AC rectification, efficiency also varies by load. At low (idle) loads losses are often much higher than at peak (design) load. When uninterruptible power supply (UPS) systems are also used these may impose further losses (e.g., approximately 0-20%).

BRIEF DESCRIPTION OF THE DRAWINGS

The features and advantages of the various embodiments will become apparent from the following detailed description in which.

DETAILED DESCRIPTION

As renewable power sources (e.g., solar panels) often generate DC power and electronic devices (e.g., computers) often require DC power, providing the DC power from the renewable power source to the electronic devices may be an efficient use of the renewable energy. By delivering DC power directly from a renewable energy source to an electronic device the losses associated with the DC-AC and AC-DC conversions can be avoided. Providing DC power directly from the renewable source could possibly realize 20-70% higher efficiency compared with a traditional arrangement where the renewable power is provided to the grid and then from the grid to the electronic device.

Due to the variable nature of power generation from the renewable power sources, the power from the renewable source likely could not meet the power demands of the electronic device. Rather, the renewable power would likely supplement the power provided by the power grid via the power supply unit (PSU) of the electronic device. Accordingly, the DC power from the renewable power source may need to be injected into the electronic device on the DC side of the PSU for the electronic device. Injecting the renewable DC power at that point enables the DC power to be provided to the electronic device either by the renewable source and/or the PSU. In order to inject DC, there needs to be place where the renewable power can be tapped into the current power system (merging the DC power provided from the PSU and the renewable source).

Figure 1:
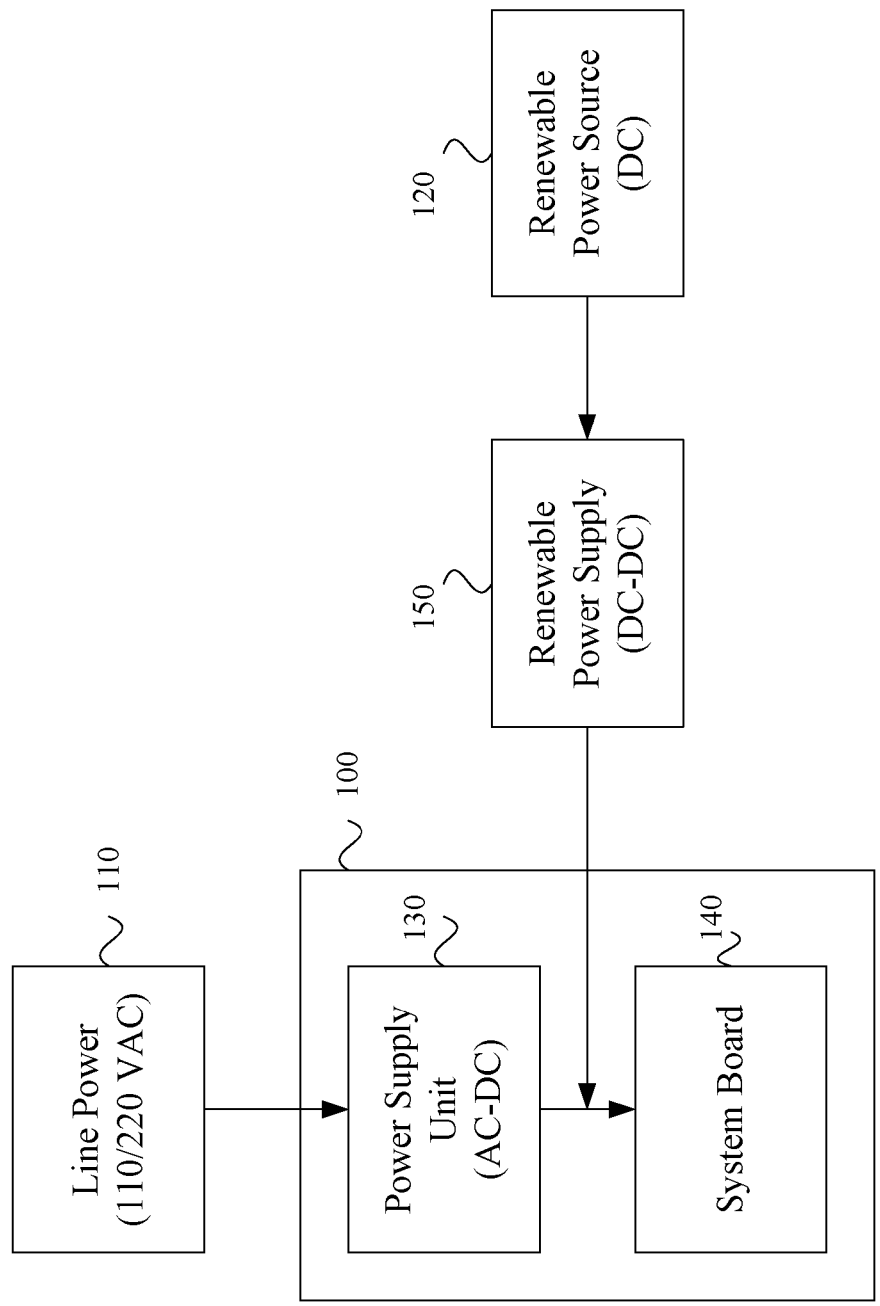
FIG. 1 illustrates a block diagram of an example computer receiving power from both line power and from a renewable power source, according to one embodiment.

FIG. 1 illustrates a block diagram of an example computer 100 receiving power from both line power 110 (e.g., wall receptacle) and from a renewable power source 120 (e.g., solar panels). The line power 110 is AC power (e.g., 110 V, 220 V). The line power 110 is provided to the PSU 130 of the computer 110 via a power cord. The PSU 130 converts the AC power to DC power and provides the DC power to a system board(s) 140. The DC power provided by the PSU 130 may be one or more different voltages (e.g., 12V, 5V, 3.3 V). The various DC voltages may be provided to one or more system boards 140. The power may be provided from the PSU 130 to the system boards 140 using standard cables. For example, the computer 100 may be an Advanced Technology eXtended (ATX) form factor computer that uses standard ATX cables and connectors to provide power between the PSU 130 and the system board(s) 140.

The power from the renewable power source 120 may be DC power and the amount of power available may be based on the renewable source (e.g., amount of sun). The power from the renewable power source 120 is provided to a renewable power supply (RPS) 150 that may convert (regulate) the renewable power to an appropriate voltage that is required by the system boards 140 (e.g., 12V, 5V, 3.3 V). The DC power from the RPS 150 is injected into the computer 100 by tapping into the DC power provided by the PSU 130. The tap (not illustrated) may be in the cable between the PSU 130 and the system board 140, may be on the system board 140, or may be in the PSU 130. The current required to provide the power at the specified voltage for a specific load of the computer 100 may be provided by the renewable power source 120 (via the RPS 150) and/or the line power 110 via the PSU 130. Because the PC's PSU 130 is a closed-loop regulated power supply, the PSU 130 may immediately reduce its output current correspondingly to any current provided by the renewable source 120 to keep its output voltage within specification. In effect, load is automatically balanced between the renewable source 120 and the traditional PSU 130.

Figure 2B:
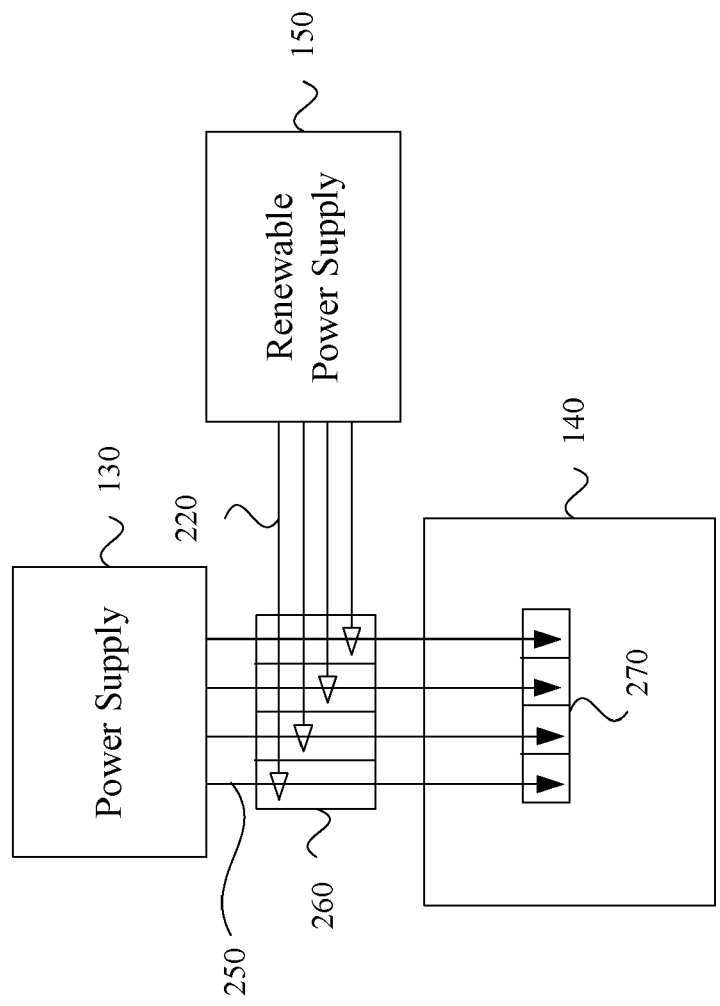
FIGS. 2A-B illustrate block diagrams of example taps for injecting DC power from a renewable power source, according to one embodiment.
Figure 2A:
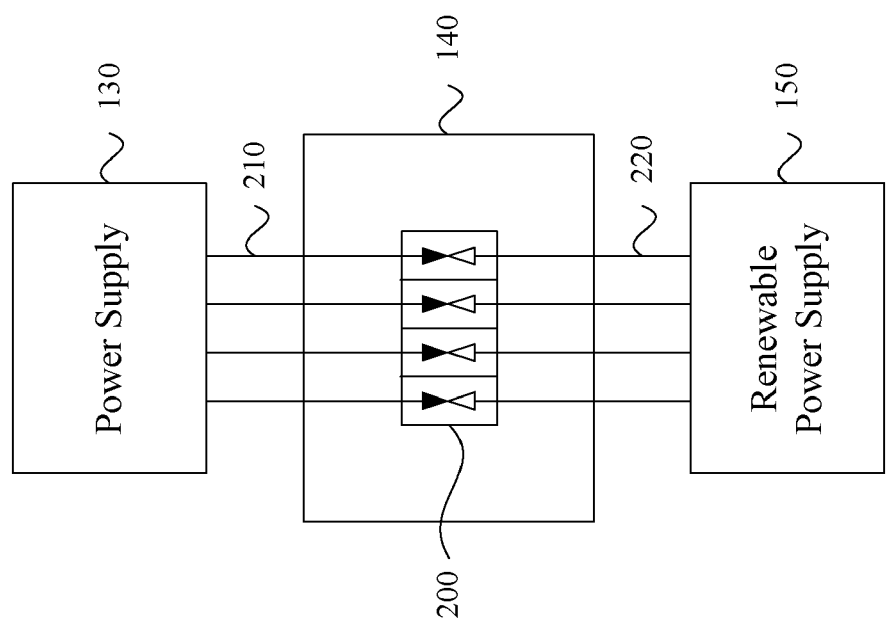

FIGS. 2A-B illustrate block diagrams of example taps for injecting DC power from a renewable power source. FIG. 2A illustrates an example tap being in the connector 200 on the system board 140. The connector 200 is modified so that it can receive power via cables 210, 220 from the PSU 130 and the RPS 150 respectively. The cable 210 is illustrated as black arrows and the cable 220 is illustrated as white arrows. The arrows may represent the flow of power in the system but the flow is not limited thereto. Rather, the cable and/or connectors may be bidirectional. FIG. 2B illustrates an example tap being in the cable 250 from the PSU 130 to the system board 140. The cable 250 may include a connector 260 to receive power via the cable 220 from the RPS 150. The cable 250 is then connected to the system board 140 via standard connector 270.

FIGS. 2A-B discuss and illustrate the connectors and cables simply receiving/providing power but are not limited thereto. Rather, certain lines in the cables and associated pins in the connectors may be utilized to provide power while other lines/pins may not be associated with power. The tap may only be associated with the power portion of the cable/connector. The cable and connectors may be standard ATX components. The tap (e.g., connector tap 200, cable tap 260) may be implemented without the need to modify the system board 140 or the PSU 130. The PSU 130 and the system board 140 may be off the shelf components.

Figure 3:
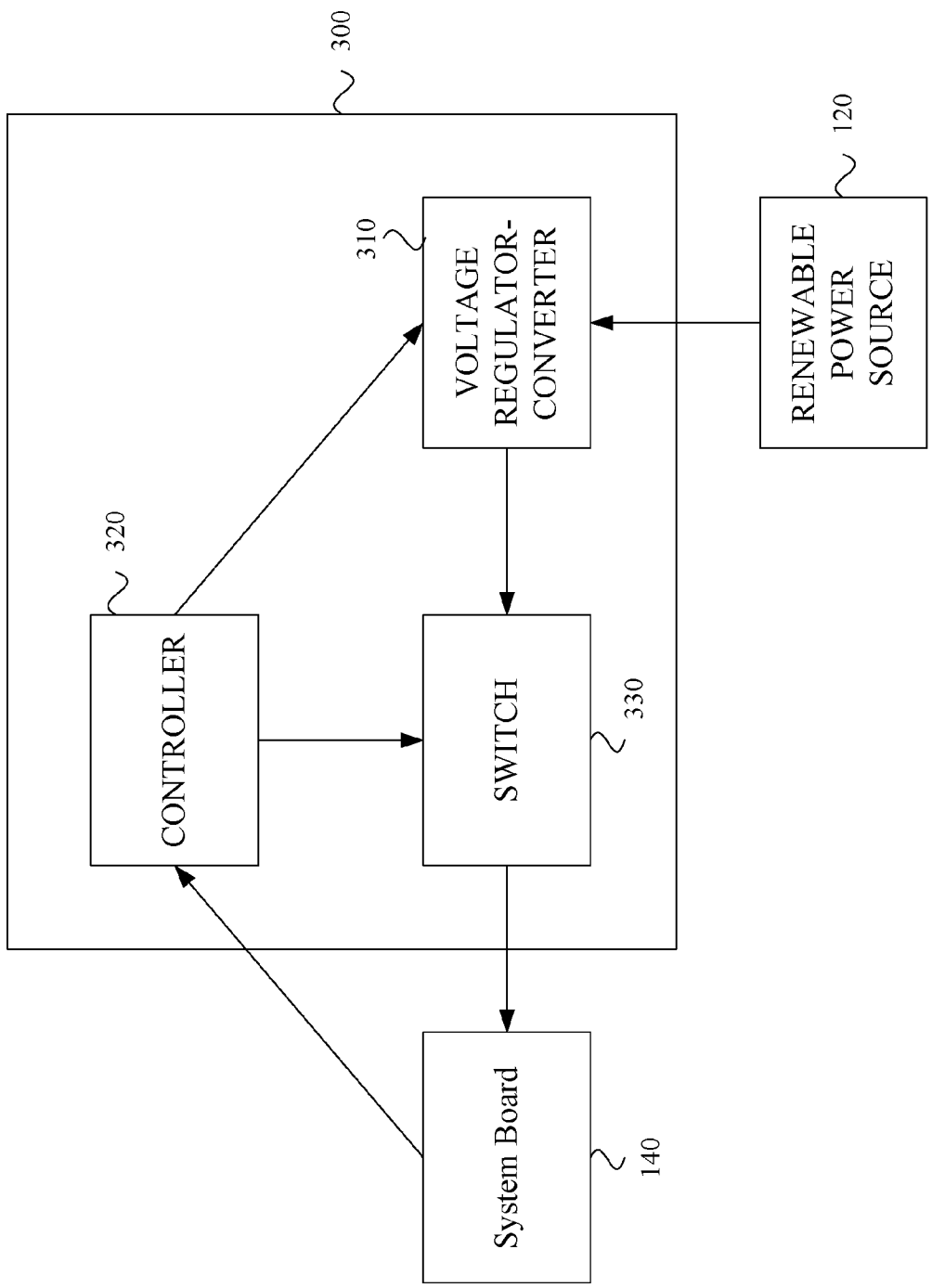
FIG. 3 illustrates an example renewable power supply (RPS) utilized to inject renewable power into the DC side of an electronic component, according to one embodiment.

FIG. 3 illustrates an example renewable power supply (RPS) 300 (e.g., 150 of FIG. 1) utilized to inject renewable power into the DC side of an electronic component (e.g., computer). The RPS 300 may include a voltage regulator or voltage converter 310, a controller 320 and a switch 330. The voltage regulator/converter 310 may receive power from the renewable power source 120 and may convert the voltage from the renewable power source 120 to the voltage (or voltages) required by the electronic component (system board 140). The voltage regulator/converter 310 may match one or more characteristics of the renewable power source 120 in order to maintain the desired voltage and provide the desired voltage. The voltage regulator/converter 310 may be a simple linear regulator such that the current is adjusted based on the load so as to maintain the desired voltage(s). The voltage regulator/converter 310 may be a DC-DC converter that may convert the voltage of power provided from a fixed or variable voltage DC bus or distribution system to deliver the desired voltage. The voltage regulator/converter 310 may be a maximum-power-point-seeking DC-DC converter that may dynamically measure and follow the maximum power point of the renewable power sources 120 current-to-voltage (I/V) curve while delivering the desired voltage.

The controller 320 may be utilized to set the desired voltage for the voltage regulator/converter 310. The controller 320 may set the desired voltage of the voltage regulator/converter 310 statically based on design parameters or dynamically based on measurements taken during operation. The controller 320 may control when the voltage regulator/converter 310 may provide current to the computer (system board 140). The controller 320 may measure the voltage provided by voltage regulator/converter 310 and the voltage on the associated voltage rail (e.g., 12V) exposed by the tap (e.g., 200 of FIG. 2A, 260 of FIG. 2B). The controller 320 may control the current flow from the voltage regulator 310 based on the voltage measurements. If the voltage provided by the voltage regulator/converter 310 is greater than the voltage measured at the voltage rail, the controller 320 may allow current to flow from the voltage regulator/converter 310. If the voltage provided by the voltage regulator/converter 310 is less than the voltage measured at the voltage rail, the controller 320 may prevent current from flowing.

The controller 320 may control the current from the voltage regulator/converter 310 by controlling the switch 330. When the controller 320 closes the switch 330 current may flow and when the controller 320 opens switch 330 the current is prevented from flowing. The switch 330 is a unidirectional switch that only allows current to flow in one direction. That is, the switch 330 is a non-backdriveable switch to ensure current is only injected into the electronic device (e.g., computer) and never drawn from it (for instance, at night when no solar power is available). The switch 330 may be a diode. The switch 330 may be an electromechanical or solid-state relay. The switch 330 may be an active device including one or more power transistors that realize higher efficiency (e.g., synchronous rectifier).

The voltage regulator/converter 310 may be set to a voltage near the upper end of the permissible range for the relevant power supply rail concerned, plus the voltage drop across the switch 330. The controller 320 may statically configure the voltage set point based on the anticipated voltage drop across the switch 330 (based on implementation/design). Alternatively, the controller 320 may dynamically configure the voltage set point by periodically measuring the actual voltage drop across the switch 330 and adjusting the setpoint of voltage regulator/converter 310 accordingly.

By way of example, a 12 V rail may have a specified regulated range between 11.4 and 12.6 V. If the anticipated voltage drop across the switch 330 is X volts the voltage set point of the voltage regulator/converter 310 may be set as 12.5+X volts. If the controller 320 dynamically adjusts the voltage set point it may periodically measure the actual voltage drop (e.g., Y volts) and adjust the set point based thereon (e.g., to 12.5+Y volts). By choosing a DC output setpoint for the voltage regulator/converter 310 near the upper end of a specified voltage range may ensure that power will be supplied preferentially from the renewable source 120 (current will be pulled from higher voltage source first).

Based on the power provided by the renewable source 120, the PSU may reduce its output current correspondingly to keep its output voltage within specification. The PSU provides any power required by the computer that can not be delivered by the renewable source 120. In effect, load is automatically balanced between the renewable source 120 and the traditional PSU by interaction between the PSU's existing voltage regulation setpoint and the setpoint of the voltage regulator/converter 310.

By way of example, if the load on the computer requires 120 W of power from the 12V DC supply 10 A of current must flow thereto. In a standard computing system the PSU would provide the 10 A. Based on the inefficiencies associated with the PSU converting AC to DC (e.g., 70-85% efficiency) the system may utilize approximately 15-30% more AC power. If we assume a 25% inefficiency rate it would require 150 W of AC power to provide the 120 W of DC power required by the system. If the renewable power source 120 could provide half of the required power (60 W, 5 A) the power provided by the PSU could be reduced accordingly to 60 W and the AC power drawn could be reduced to 75 W. By providing 60 W DC from the renewable source you may save 75 W AC. A conversion loss of approximately 10% on the DC injection side would result in 66 W DC being required from the renewable source 120 to deliver the 60 W to the system. The savings is thus 9 W, as providing 66 W DC from the renewable source reduces 75 W AC from the power grid.

However, the above example also doesn't take into account the loses that would be associated with connecting the renewable power source to the power grid or any losses that may be associated with using a UPS. The overall power savings may be greater when taking all factors into account. As the PSUs are typically more efficient at higher loads, the power savings associated with injecting the DC power from the renewable source 120 into the computer will be greater at lower loads (e.g., idle, sleep).

It is possible depending on the load and the amount of power in the renewable power source 120 that the renewable power source 120 may be able to provide all the power to the computer and the PSU will not be required to provide any power. While most PSUs are likely to be able to handle this condition, some PSUs may not be designed to handle this condition. For example, if the PSU is not providing any power the PSU may assume the system is off and power itself off. Accordingly, it is important that the operation of the PSU is maintained within specification.

In order to ensure that the PSU is operated within specification the voltage set point of the voltage regulator/converter 310 may be adjusted to ensure that a certain amount of power is provided by the PSU. In order to do this the amount of current drawn by the system board may be measured and provided to the controller 320. The controller 320 may compare the measured current to the current being provided by the renewable power source 120 to ensure that the difference is at least equal to the minimum current requirement of the PSU. If the minimum current is not being provided by the PSU (too much current is provided by the renewable source) the controller 320 may adjust the voltage set point of voltage regulator/converter 310 accordingly (e.g., reduce the set point so that the preference for drawing power from the renewable source is reduced). Alternatively, the measured current may be provided to the PSU and the PSU may adjust its voltage set point to adjust the current being provided thereby.

A shunt current-sensing resistor (not illustrated) may be added to the tap and wired in series with a given power supply rail in order to measure the current being drawn. Feedback circuitry (not illustrated) may be utilized to provide the sensed current to the controller 320. Alternatively, the feedback circuitry may be utilized to provide the sensed current to the PSU.

Current injection is possible for any of the rails provided by the PSU to the system board. The most effective injection targets will be the most commonly used voltage rails. In modern system, the various voltage rails provided by the PSU are being reduced and the system boards are performing DC-DC conversion for additional voltages that may be needed. For example, the PSU may provide 12V to the system board and the system board may convert the 12V to other voltages that may be required.

FIG. 3 illustrated the RPS 300 having three distinct components but is in no way limited thereto. Rather, the voltage regulator/converter 310, the controller 320 and the switch 330 are functional units that may be implemented in various different embodiments.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Furthermore, FIG. 3 illustrates separate connections between the system board 140 and the controller 320 and the switch 330 but is not limited thereto. The arrows simply illustrate communications between the units and not a physical connection thereto. All communications between the RPS 300 and the system board 140 may be provided over a single connection. While not illustrated the RPS 300 includes an input to receive power from the renewable source 120 and an output to provide power to the system board 140.

The disclosure has focused on injecting power from the renewable power source 120 into a computer but is not limited thereto. Rather, power from the renewable power source 120 can be converted to the appropriate DC voltage for any electronic device and injected there into. The renewable power source 120 may feed multiple electronic devices at once. However, it may not be practical for electronic components that are not pulling a sufficient amount of power as the power savings may not justify the investment. Furthermore, the size of some electronic components may make the insertion of a tap impractical. The conversion of AC power to DC power may be performed in the power cord for certain electronic devices and it may be possible to tap into the power cord to provide the renewable power injection.

Moreover, the disclosure focused on solar being the renewable power source but is not limited thereto. Rather, the renewable power source could be any system generating power from renewable means (e.g., wind, water). Renewable means that produce a substantial amount of their power as DC are preferable.

For environments in which a DC distribution system is utilized to provide DC power to various electronic components the DC power from a renewable source could also be directly injected at the distribution level. For example, some datacenter-scale installations utilize 48V DC power distribution approaches to better match telecom-style battery banks or minimize PSU losses.

The efficient use of injection DC power directly into the DC side of electronic components power systems may make computing the load of choice for distributed generation of renewable power (e.g., solar). That is, enterprises and individuals installing renewable energy generation systems may prefer to feed the power generated thereby to their electronic devices (e.g., computers, servers) rather then other potential uses or providing to the power grid because of the efficiency multiplier possible.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. An apparatus to:
receive DC power from a renewable power source;
convert the renewable DC power to a DC voltage associated with an electronic device; and
inject the renewable DC power at the associated DC voltage into the electronic device by tapping into DC side of a power supply unit for the electronic device that converts AC power from a power grid to DC power at the associated DC voltage,
wherein the apparatus comprises a voltage regulator/converter to adjust current drawn from the renewable power source to maintain the associated DC voltage.

2. The apparatus of claim 1, wherein the voltage regulator/converter is a DC-DC converter to convert voltage of the renewable DC power provided from a fixed or variable voltage DC bus or distribution system to the associated DC voltage.

3. The apparatus of claim 1, wherein the voltage regulator/converter is a maximum-power-point-seeking DC-DC power converter to dynamically measure and follow a maximum power point of the renewable power sources current-to-voltage (I/V) curve and maintain the associated DC voltage.

4. The apparatus of claim 1, wherein a voltage set point of the voltage regulator/converter is set to a voltage near an upper end of a permissible range for the electronic device.

5. The apparatus of claim 1, further comprising a controller to determine when to allow current to flow from the voltage regulator/converter to the electronic device.

6. The apparatus of claim 5, further comprising a non-backdriveable switch to ensure current is only injected into the electronic device and not drawn from it.

7. The apparatus of claim 6, wherein the switch is a synchronous rectifier.

8. The apparatus of claim 6, wherein a voltage set point of the voltage regulator/converter is set to a voltage near an upper end of a permissible range for the electronic device plus a voltage drop for the switch.

9. The apparatus of claim 8, wherein the controller is to dynamically adjust the voltage set point of the voltage regulator/converter.

10. The apparatus of claim 9, wherein the controller is to dynamically adjust the voltage set point based on feedback received regarding current drawn by the electronic device to ensure the power supply unit for the electronic device operates within specification.

11. A computer system comprising:
a power supply unit to receive AC power from a power grid and to convert the AC power to DC power at a specified DC voltage;
a system board operating at the specified DC voltage to perform certain functions;
a connection between the power supply unit and the system board to provide the DC power at the specified DC voltage from the power supply unit to the system board; and
a tap between a DC side of the power supply unit and the system board to receive DC power from a renewable power source at the specified DC voltage, wherein
the system board is to receive power from the power supply unit and the renewable power source, and
the power supply unit is a closed loop regulated system so power provided to the system board by the renewable source reduces power provided to the system board by the power supply unit.

12. The system of claim 11, wherein a voltage set point of the renewable power source is set on high range for the specific DC voltage to ensure that power will be supplied preferentially to the system board from the renewable source.

13. The system of claim 11, wherein the tap is in the connection.

14. The system of claim 11, wherein the tap is in the power supply unit.

15. The system of claim 11, wherein the renewable power source is solar.

16. The system of claim 11, further comprising a renewable power supply including a voltage regulator/converter to adjust current drawn from the renewable power source to maintain the specific DC voltage and a controller to determine when to allow the current to flow from the voltage regulator/converter to the system board.

17. A computer system comprising:
a power supply unit to receive AC power from a power grid and to convert the AC power to DC power at a specified DC voltage;
a system board operating at the specified DC voltage to perform certain functions;
a connection between the power supply unit and the system board to provide the DC power at the specified DC voltage from the power supply unit to the system board; and
a tap between a DC side of the power supply unit and the system board to receive DC power from a renewable power source at the specified DC voltage, wherein the tap includes a current-sensing shunt resister and feedback circuitry.

18. The system of claim 17, wherein the tap is in the connection.

19. The system of claim 17, wherein the tap is in the power supply unit.

20. The system of claim 17, wherein the renewable power source is solar.

* * * * *